(12) United States Patent
Suzuki et al.

(10) Patent No.: US 8,957,139 B2
(45) Date of Patent: Feb. 17, 2015

(54) MICROPARTICLE/POLYROTAXANE—CONTAINING COATING, MICROPARTICLE/POLYROTAXANE—CONTAINING COATING FILM AND COATED ARTICLE

(75) Inventors: Tatsuya Suzuki, Machida (JP); Kentarou Watanabe, Atsugi (JP); Tetsurou Kikugawa, Kanagawa (JP); Masahiko Yamanaka, Isehara (JP); Changming Zhao, Tokyo (JP); Yuki Hayashi, Kashiwa (JP); Yuki Amamoto, Yokohama (JP)

(73) Assignees: Nissan Motor Co., Ltd., Yokohama-shi (JP); Advanced Softmaterials, Inc., Kashiwa-shi (JP)

( * ) Notice: Subject to any disclaimer, the term of this patent is extended or adjusted under 35 U.S.C. 154(b) by 653 days.

(21) Appl. No.: 13/148,412

(22) PCT Filed: Feb. 9, 2010

(86) PCT No.: PCT/JP2010/051867
§ 371 (c)(1),
(2), (4) Date: Aug. 8, 2011

(87) PCT Pub. No.: WO2010/092948
PCT Pub. Date: Aug. 19, 2010

(65) Prior Publication Data
US 2011/0319527 A1    Dec. 29, 2011

(30) Foreign Application Priority Data

Feb. 16, 2009 (JP) .................................. 2009-032814
Dec. 24, 2009 (JP) .................................. 2009-292044

(51) Int. Cl.
| | | |
|---|---|---|
| *C08K 3/22* | (2006.01) |
| *C08K 3/36* | (2006.01) |
| *C23C 24/08* | (2006.01) |
| *C08B 37/16* | (2006.01) |
| *C08G 83/00* | (2006.01) |
| *C09D 5/16* | (2006.01) |
| *C09D 7/12* | (2006.01) |
| *C09D 105/16* | (2006.01) |
| *C09D 171/02* | (2006.01) |
| *C23C 26/00* | (2006.01) |
| *C23C 26/02* | (2006.01) |
| *C23C 30/00* | (2006.01) |

(52) U.S. Cl.
CPC ............. *C23C 24/08* (2013.01); *C08B 37/0012* (2013.01); *C08G 83/007* (2013.01); *C09D 5/1637* (2013.01); *C09D 7/1216* (2013.01); *C09D 7/1266* (2013.01); *C09D 7/1275* (2013.01); *C09D 105/16* (2013.01); *C09D 171/02* (2013.01); *C23C 26/00* (2013.01); *C23C 26/02* (2013.01); *C23C 30/00* (2013.01); *C08K 3/22* (2013.01); *C08K 3/36* (2013.01); *Y02T 50/67* (2013.01)
USPC .............. 524/54; 524/500; 524/504; 524/401

(58) Field of Classification Search
CPC ........... C08L 51/02; C08L 5/02; C08L 5/053; C08L 3/00
USPC .................................. 524/54, 500, 504, 401
See application file for complete search history.

(56) References Cited

U.S. PATENT DOCUMENTS

| | | | |
|---|---|---|---|
| 6,096,464 A * | 8/2000 | Sundararajan et al. .... 430/58.05 |
| 7,727,635 B2 | 6/2010 | Furuya et al. |
| 7,799,867 B2 | 9/2010 | Ito et al. |
| 7,847,049 B2 | 12/2010 | Ito et al. |
| 7,893,155 B2 | 2/2011 | Ito et al. |
| 2003/0027917 A1 | 2/2003 | Namiki et al. |
| 2009/0047532 A1 | 2/2009 | Ito et al. |
| 2009/0281213 A1 | 11/2009 | Ito et al. |
| 2009/0312490 A1 | 12/2009 | Ito et al. |

FOREIGN PATENT DOCUMENTS

| | | |
|---|---|---|
| JP | 10-45867 A | 2/1998 |
| JP | 2000-136332 A | 5/2000 |
| JP | 2002-285073 A | 10/2002 |
| JP | 2002-327146 A | 11/2002 |
| JP | 2007-091938 A | 4/2007 |

(Continued)

OTHER PUBLICATIONS

Translation of Table 2 of JP 2008-310286 previously cited in an IDS on Aug. 8, 2011, (2 pgs.).
English language translation for JP 2007-099990 (29 pgs.).
English language translation for JP 2007-099991 (30 pgs.).
English language translation for JP 2007-106863 (29 pgs.).
English language translation for JP 2007-106865 (25 pgs.).
English language translation for JP 2007-105620 (35 pgs.).
English language translation for JP 2007-106870 (32 pgs.).
English language translation for JP 2008-200922 (51 pgs.).
English language translation for JP 2008-310286 (70 pgs.).

(Continued)

*Primary Examiner* — Kelechi Egwim
(74) *Attorney, Agent, or Firm* — Foley & Lardner LLP (57) ABSTRACT

There is provided a microparticle/polyrotaxane-containing coating with high abrasion resistance and chemical resistance. There are also provided a microparticle/polyrotaxane-containing coating film and a coated article. The microparticle/polyrotaxane-containing coating includes a solvent-based coating material, a modified polyrotaxane having a caprolactone modification group (—CO(CH$_2$)$_5$OH) and microparticles having an average particle size of smaller than 380 nm. The microparticle/polyrotaxane-containing coating film is in the form of a layer of the microparticle/polyrotaxane-containing coating on an article to be coated. The coated article includes the microparticle/polyrotaxane-containing coating film and an article to be coated.

8 Claims, 3 Drawing Sheets

(56) References Cited

FOREIGN PATENT DOCUMENTS

| | | |
|---|---|---|
| JP | 2007-099989 A | 4/2007 |
| JP | 2007/099990 A | 4/2007 |
| JP | 2007-099991 A | 4/2007 |
| JP | 2007-105620 A | 4/2007 |
| JP | 2007-106863 A | 4/2007 |
| JP | 2007-106865 A | 4/2007 |
| JP | 2007-106870 A | 4/2007 |
| JP | 2008-200922 A | 9/2008 |
| JP | 2008-291186 A | 12/2008 |
| JP | 2008-310286 A | 12/2008 |
| JP | 2009-012375 A | 1/2009 |
| JP | 2009/215351 A | 9/2009 |
| WO | WO 2005/052026 A1 | 6/2005 |
| WO | WO 2005/080469 A1 | 9/2005 |
| WO | WO 2007/040262 A1 | 4/2007 |
| WO | WO 2007/040264 A1 | 4/2007 |

OTHER PUBLICATIONS

English language translation for JP 2009-012375 (28 pgs.).
English language translation for JP 2009-215351 (25 pgs.).
English language translation for JP 2007-099989 (30 pgs.).

\* cited by examiner

MICROPARTICLE/POLYROTAXANE—CONTAINING COATING, MICROPARTICLE/POLYROTAXANE—CONTAINING COATING FILM AND COATED ARTICLE

TECHNICAL FIELD

The present invention relates to a microparticle/polyrotaxane (occasionally abbreviated as "PR")-containing coating, a microparticle/PR-containing coating film and a coated article. More particularly, the present invention relates to a microparticle/PR-containing coating that contains a polyrotaxane and microparticles of given average particle size, a microparticle/PR-containing coating film and a coated article.

BACKGROUND ART

In recent years, some outer parts of automotive vehicles have been changed from metal members to plastic members for the purpose of vehicle body weight reduction and design flexibility improvement. In general, the plastic members are given coating.

For example, fenders and back-door panels are formed of rigid plastic materials such as sheet molding compounds (SMC) and polymer alloys. These rigid plastic members are each coated with an undercoat and a top coat, as in the case of metal materials, after coated with a primer coat. On the other hand, bumpers and side sill spoilers where bending resistance and impact resistance are required are formed of soft plastic materials such as polypropylene and urethane. These soft plastic members are each coated with a primer coat and a soft top coat.

There has also recently been proposed a coating material using a polyrotaxane known as a ring-slide gel for improvements in abrasion resistance (see Patent Document 1).
Patent Document 1: Japanese Patent Publication No. 2007-99989

SUMMARY OF THE INVENTION

Problems to be Solved by the Invention

It is desired for the coating material using such a ring-slide gel, polyrotaxane, to attain further improved coating performance.

The present inventors have found, as a result of extensive researches, that there is a possibility that a film of a coating material using a ring-slide gel, polyrotaxane, gets swelled due to the entry of a chemical into the gel.

The present invention was made to solve the above new problems. It is an object of the present invention to provide a microparticle/PR-containing coating capable of achieving high abrasion resistance and chemical resistance as well as a microparticle/PR-containing coating film and a coated article.

Means for Solving the Problems

As a result of further extensive researches, the present inventors have found that the above object can be achieved by preparing a microparticle/PR-containing coating according to the following conditions (1) and (2) and applying the resulting coating.

(1) The coating contains a modified polyrotaxane having a caprolactone modification group ($CO(CH_2)_5OH$).
(2) The coating contains microparticles having an average particle size of smaller than 380 nm.

Namely, a microparticle/PR-containing coating of the present invention comprises a solvent-based coating material, a modified polyrotaxane having a caprolactone modification group ($CO(CH_2)_5OH$) and microparticles having an average particle size of smaller than 380 nm. The modified polyrotaxane has a cyclic molecule, a linear molecule passing through and included in the cyclic molecule and blocking groups arranged on opposite ends of the linear molecule to keep the cyclic molecule skewered with the linear molecule.

A microparticle/PR-containing coating film of the present invention is in the form of a layer of the microparticle/PR-containing coating of the present invention on an article to be coated.

Further, a coated article of the present invention includes the microparticle/PR-containing coating film of the present invention and an article to be coated.

It is possible according to the present invention to impart high abrasion resistance and chemical resistance to the microparticle/PR-containing coating, the microparticle/PR-containing coating film and the coated article by preparing the microparticle/PR-containing coating according to the above conditions (1) and (2) and applying the resulting coating.

DETAILED DESCRIPTION

Hereinafter, the microparticle/PR-containing coating of the present invention will be described below in detail. In the specification and claims, all percentages (%) of the content amount and concentration values are by mass unless otherwise specified.

The microparticle/PR-containing coating of the present invention contains a solvent-based coating material, a modified polyrotaxane having a caprolactone modification group ($CO(CH_2)_5OH$) and microparticles having an average particle size of smaller than 380 nm. The modified polyrotaxane has a cyclic molecule, a linear molecule passing through and included in the cyclic molecule and blocking groups arranged on opposite ends of the linear molecule to keep the cyclic molecule skewered with the linear molecule. This microparticle/PR-containing coating can achieve high abrasion resistance and chemical resistance and thus can suitably be used for applications where such performance is required.

The modified polyrotaxane with the caprolactone modification group ($CO(CH_2)_5OH$) exhibits solubility in organic solvents such as ethyl acetate and toluene as discussed in Japanese Laid-Open Patent Publication No. 2007-99989 cited above as Patent Document 1 and in Japanese Laid-Open Patent Publication No. 2007-91938 and can be applied to the coating. Further, the microparticles contained in the coating performs the shielding function of blocking the entry passage of a chemical around the modified polyrotaxane in the coating film so as to reduce the entry of the chemical into the polyrotaxane and thereby prevent swelling of the polyrotaxane.

It is essential that the microparticles has an average particle size of smaller than 380 nm. The average particle size of the microparticles is preferably 1 to 100 nm, more preferably 1 to 50 nm. When the average particle size of the microparticles is smaller than 380 nm, it is possible that the microparticles can perform the shielding function without causing change in coating surface color due to reflection or refraction of visible light by these microparticles. In the present invention, the "average particle size" is defined as a measured value according to Coulter counter method.

The content amount of the microparticles in the microparticle/PR-containing coating is preferably 1 to 30 mass %, more preferably 5 to 20 mass %, still more preferably 10 to 15 mass %. When the content amount of the microparticles is in the above range, it is possible to reduce the entry of the chemical into the polyrotaxane and improve the chemical resistance of the coating film while attaining the fundamental ductility of the coating film and maintaining the mechanical properties such as impact resistance of the coating film. It is also possible to secure the sufficient content amount of the modified polyrotaxane sufficiently and ensure the abrasion resistance of the coating film.

There is no particular limitation on the microparticles as long as the microparticles has good abrasion resistance and chemical resistance and can be applied to the microparticle/PR-containing coating. Examples of the microparticles are fine particles of silica, alumina, titania, zirconia, zeolite, sepiolite, talc, calcium carbonate clay, kaoline, gold, silver, platinum and the like. These particles can be used solely or in combination of two or more kinds thereof. The microparticles may be treated so as to have a reactive group capable of reacting with the after-mentioned curing agent, such as a hydroxyl group, before use. Further, the microparticles may be treated with polysiloxane etc. for improvement in dispersibility. Among others, fine particles of silica and alumina are preferred in view of the fact that the silica and alumina fine particles can be easily surface-modified and have good dispersibility in the coating material.

The modified polyrotaxane with the caprolactone modification group ($CO(CH_2)_5OH$) has a basic skeleton in which the linear molecule passes through the cyclic molecule, with the blocking groups arranged on opposite ends of the linear molecule to keep the cyclic molecule skewered with the linear molecule, as mentioned above.

There is no particular limitation on the cyclic molecule as long as long as the cyclic molecule has a cyclic structure that can be skewered with the linear molecule to produce a pulley effect. In the present specification, the "cyclic structure" is not necessarily a completely closed cyclic structure and may be a substantially cyclic structure such as C-shaped structure. Preferably, the cyclic molecule has a reactive group for ease of introduction of the modification group and the like. Examples of the reactive group include, but are not limited to, a hydroxyl group, a carboxyl group, an amino group, an epoxy group, an isocyanate group, a thiol group and an aldehyde group. Preferred as the reactive group are those that do not react with the blocking groups during the formation of the blocking groups (blocking reaction). From this point of view, the reactive group is preferably a hydroxyl group, an epoxy group or an amino group, more preferably a hydroxyl group.

As the cyclic molecule, there can be used cyclodextrins, crown ethers, benzo-crowns, dibenzo-crowns, dicyclohexano-crowns, and derivatives and modified variants thereof. Among others, cyclodextrins and derivatives thereof are suitably used. The kinds of the cyclodextrins and derivatives thereof are not particularly limited. The cyclodextrins can be of either α-type, β-type, γ-type, δ-type or ε-type. The cyclodextrin derivatives can also be of either α-type, β-type, γ-type, δ-type or ε-type. Herein, the term "cyclodextrin derivatives" refers to chemical modifications such as amino modification, tosyl modification, methyl modification, propyl modification, monoacetyl modification, triacetyl modification, benzoyl modification, sulfonyl modification and monochlorotriazinyl modification. Specific examples of the cyclodextrins and cyclodextrin derivatives usable in the present invention are: cyclodextrines such as α-cyclodextrin (glucose number: 6), β-cyclodextrin (glucose number: 7) and γ-cyclodextrin (glucose number: 8); and cyclodextrin derivatives such as dimethylcyclodextrin, glucosylcyclodextrin, 2-hydroxypropyl-α-cyclodextrin, 2,6-di-O-methyl-α-cyclodextrin, 6-O-α-maltosyl-α-cyclodextrin, 6-O-α-D-glucosyl-α-cyclodextrin, hexakis(2,3,6-tri-O-acetyl)-α-cyclodextrin, hexakis(2,3,6-tri-O-methyl)-α-cyclodextrin, hexakis(6-O-tosyl)-α-cyclodextrin, hexakis(6-amino-6-deoxy)-α-cyclodextrin, hexakis(2,3-acetyl-6-bromo-6-deoxy)-α-cyclodextrin, hexakis(2,3,6-tri-O-octyl)-α-cyclodextrin, mono(2-O-phosphoryl)-α-cyclodextrin, mono[2,(3)-O-(carboxymethyl)]-α-cyclodextrin, octakis(6-O-t-butyldimethylsilyl)-α-cyclodextrin, succinyl-α-cyclodextrin, glucuronylglucosyl-β-cyclodextrin, heptakis(2,6-di-O-methyl)-β-cyclodextrin, heptakis(2,6-di-O-ethyl)-β-cyclodextrin, heptakis(6-O-sulfo)-β-cyclodextrin, heptakis(2,3-di-O-acetyl-6-O-sulfo)-β-cyclodextrin, heptakis(2,3-di-O-methyl-6-O-sulfo)-β-cyclodextrin, heptakis(2,3,6-tri-O-acetyl)-β-cyclodextrin, heptakis(2,3,6-tri-O-benzoyl)-β-cyclodextrin, heptakis(2,3,6-tri-O-methyl)-β-cyclodextrin, heptakis(3-O-acetyl-2,6-di-O-methyl)-β-cyclodextrin, heptakis(2,3-O-acetyl-6-bromo-6-deoxy)-β-cyclodextrin, 2-hydroxyethyl-β-cyclodextrin, hydroxypropyl-β-cyclodextrin, 2-hydroxypropyl-β-cyclodextrin, (2-hydroxy-3-N,N,N-trimethylamino)propyl-β-cyclodextrin, 6-O-α-maltosyl-β-cyclodextrin, methyl-β-cyclodextrin, hexakis(6-amino-6-deoxy)-β-cyclodextrin, bis(6-azide-6-deoxy)-β-cyclodextrin, mono(2-O-phosphoryl)-β-cyclodextrin, hexakis[6-deoxy-6-(1-imidazolyl)]-β-cyclodextrin, monoacetyl-β-cyclodextrin, triacetyl-β-cyclodextrin, monochlorotriazinyl-β-cyclodextrin, 6-O-α-D-glucosyl-β-cyclodextrin, 6-O-α-D-maltosyl-β-cyclodextrin, succinyl-β-cyclodextrin, succinyl-(2-hydroxypropyl)-β-cyclodextrin, 2-carboxymethyl-β-cyclodextrin, 2-carboxyethyl-β-cyclodextrin, butyl-β-cyclodextrin, sulfopropyl-β-cyclodextrin, 6-monodeoxy-6-monoamino-β-cyclodextrin, silyl[(6-O-t-butyldimethyl)2,3-di-O-acetyl]-β-cyclodextrin, 2-hydroxyethyl-γ-cyclodextrin, 2-hydroxypropyl-γ-cyclodextrin, butyl-γ-cyclodextrin, 3A-amino-3A-deoxy-(2AS, 3AS)-γ-cyclodextrin, mono-2-O-(p-toluenesulfonyl)-γ-cyclodextrin, mono-6-O-(p-toluenesulfonyl)-γ-cyclodextrin, mono-6-O-mesitylenesulfonyl-γ-cyclodextrin, octakis(2,3,6-tri-O-methyl)-γ-cyclodextrin, octakis(2,6-di-O-phenyl)-γ-cyclodextrin, octakis(6-O-t-butyldimethylsilyl)-γ-cyclodextrin and octakis(2,3,6-tri-O-acetyl)-γ-cyclodextrin. These cyclic molecules such as cyclodextrins can be used solely or a combination of two or more kinds thereof. Among the above cyclic molecules, α-cyclodextrin, β-cyclodextrin, γ-cyclodextrin and derivatives thereof are preferred. Particularly preferred is α-cyclodextrin in terms of inclusion of the linear molecule.

There is also no particular limitation on the linear molecule as long as the linear molecule can be contained as a constituent of the polyrotaxane in the high abrasion- and chemical-resistant microparticle/PR-containing coating.

As the linear molecule, there can be used polyalkylenes, polyesters, polyethers, polyamides, polyacryls and benzene ring-containing linear compounds. These linear molecules can be used solely or in combination of two or more kinds thereof. Examples of the polyalkylenes includes polyethylene, polypropylene, polyisoprene and polybutadiene. Examples of the polyesters, polyamides, benzene ring-containing linear compounds and polyacryls are ordinary, commonly used ones. Examples of the polyethers include polyethylene glycol, which can suitably be used in terms of inclusion in the cyclic molecule as well as solubility in water or aqueous solvents.

The blocking groups can be of any kind capable of being bonded to the opposite ends of the linear molecule to keep the cyclic molecule skewered with the linear molecule. As such blocking groups, there can be used bulky and ionic groups. The term "groups" herein refers to various groups such as molecular groups and polymer groups.

The bulk groups can be in spherical form or lateral-wall form and each has ionicity to interact with (e.g. repel) ionicity of the cyclic molecule to keep the cyclic molecule skewered with the linear molecule.

Specific examples of the blocking groups are dinitrophenyls such as 2,4-dinitrophenyl and 3,5-dinitrophenyl, cyclodextrins, adamantanes, trityls, fluoresceins, pyrenes, and derivatives and modified variants thereof.

A specific example of the modified polyrotaxane with the caprolactone modification group ($CO(CH_2)_5OH$) is one in which; the cyclic molecule is a cyclodextrin having a part or all of hydroxyl groups modified with the caprolactone modification group ($CO(CH_2)_5OH$) and, more specifically, one in which the cyclic molecule is a cyclodextrin having a part or all of hydroxyl groups modified with the caprolactone modification group ($—CO(CH_2)_5OH$) bonded to a $—O—C_3H_6—O—$ group. For example, the polyrotaxane with the caprolactone modification group ($—CO(CH_2)_5OH$) bonded to the $—O—C_3H_6—O—$ group can be prepared by reacting a hydroxyl group or groups of cyclodextrin of the polyrotaxane with propylene oxide and then treating the resulting hydroxypropylated polyrotaxane with caprolactone. This modified polyrotaxane exhibits good solubility in organic solvents such as ethyl acetate and toluene and thus can suitably be applied to the coating. Further, the coating film using the coating of the present invention can attain improved abrasion resistance under the pulley effect of such a polyrotaxane.

In the microparticle/PR-containing coating, the solvent-based coating material can be prepared by mixing a solvent with at least one kind selected from the group consisting of a resin component, a curing agent, an additive, a pigment and a brightening agent. Preferably, the solvent-based coating material contains a solvent, a resin component and at least one of a curing agent, an additive, a pigment and a brightening agent.

There is no particular limitation on the solvent as long as the modified polyrotaxane with the caprolactone modification group ($—CO(CH_2)_5OH$) can be dissolved in the solvent. Examples of the solvent are organic solvents including: esters such as ethyl acetate and butyl acetate; ketones such as methyl ethyl ketone; ethers such as diethyl ether; and aromatic compounds such as toluene. These organic solvents can be used as appropriate. When the above kind of solvent is mixed in the coating material, the coating can suitably be used for applications where high abrasion resistance and chemical resistance are required.

As the resin component, there can be used cellulosic resins, polyolefin resins, polyester resins, polyvinyl chloride resins, polystyrene resins, acrylic resins, polycarbonate resins, polyurethane resins and ABS resins. These resins can be used solely or in combination of two or more kinds thereof. It is preferable that the resin component has, on a main or side chain thereof, a hydroxyl group, an amino group, a carboxyl group, an epoxy group, a vinyl group, a thiol group, a photo-crosslinking group or any combination thereof. Examples of the photo-crosslinking group are cinnamic acid, coumarin, chalcone, anthracene, styryl pyridine, styryl pyridinium salt and styryl quinoline salt. In the case of using a mixture of two or more kinds of resin components, it is preferable that at least one of the two or more kinds of resin components is bonded to the polyrotaxane via the cyclic molecule. The resin component can be in the form of either a homopolymer or a copolymer. Further, the copolymer may be formed of two or more kinds of monomers and may be in the form of either a block copolymer, an alternating copolymer, a random copolymer or a graft copolymer.

Specific examples of the resin component are polyvinyl alcohol, polyvinyl pyrrolidone, poly(meth)acrylic acid, cellulosic resins such as carboxymethyl cellulose, hydroxyethyl cellulose and hydroxypropyl cellulose, polyacrylamide; polyethylene oxide, polyethylene glycol, polypropylene glycol, polyvinyl acetal, polyvinyl methyl ether, polyamine, polyethylene imine, casein, gelatin, starch and copolymers thereof, polyolefin resins such as polyethylene, polypropylene and copolymers thereof with other olefinic monomers, polyester, polyvinyl chloride, polystyrene resins such as polystyrene and acrylonitrile-styrene copolymer, polyacrylate resins such as polymethyl methacrylate, (meth)acrylic acid ester copolymer and acrylonitrile-methylacrylate copolymer, polycarbonate, polyurethane, vinyl chloride-vinyl acetate copolymer, polyvinyl butyral and derivatives or modified variants thereof, polyisobutylene, polytetrahydrofuran, polyaniline, acrylonitrile-butadiene-styrene copolymer (ABS resin), polyamide resins such as nylon (registered tradename), polyimide, polydiene resins such as polyisoprene and polybutadiene, polysiloxane resins such as polydimethyl siloxane, polysulfone, polyimine, acetic polyanhydride, polyurea, polysulfide, polyphosphazene, polyketone, polyphenylene, polyhaloolefin and derivatives thereof. As the resin derivatives, preferred are those having a hydroxyl group, an amino group, a carboxyl group, an epoxy group, a vinyl group, a thiol group, a photo-crosslinking group or any combination thereof, as mentioned above.

Specific examples of the curing agent are melamine resin, polyisocyanate compound, block isocyanate compound, cyanuric chloride, trimesoyl chloride, terephthaloyl chloride, epichlorohydrin, dibromobenzene, glutaric aldehyde, phenylene diisocyanate, trilene diisocyanate, divinyl sulfone, 1,1'-carbonyldiimidazole and alkoxysilane. These curing agents can be used solely or in combination of two or more kinds thereof.

Specific examples of the additive are a dispersant, an ultraviolet absorber, a light stabilizer, a surface conditioner and an anti-poping agent.

Specific examples of the pigment are: organic coloring pigments such as azo pigments, phthalocyane pigments and perilene pigments; and inorganic coloring pigments such as carbon black, titanium dioxide and iron red.

Specific examples of the brightening agent include aluminum pigments and mica pigments.

The content amount of the modified polyrotaxane in the microparticle/PR-containing coating is preferably 1 to 90 mass %, more preferably 10 to 50 mass %, still more preferably 20 to 40 mass %. When the content amount of the modified polyrotaxane is in the above range, it is possible to secure the abrasion resistance of the microparticle/PR-containing coating under the pulley effect of the polyrotaxane as will be mentioned in detail later and ensure the smoothness and appearance quality of the coating film. There is a tendency that the film of this coating increases in ductility, but decreases in rigidity (Young modulus), with increase in the content of the modified polyrotaxane.

The above-mentioned microparticle/PR-containing coating can suitably be used for articles where high abrasion resistance and chemical resistance are required with no particular limitation on shape. For the formation of the microparticle-PR containing coating film, it is feasible to apply the microparticle/PR-containing coating by brush process, spraying process, electrostatic painting process, electropainting process, powder coating process, sputtering process, in-mold coating process etc., and then, heat and dry the coating. The microparticle/PR-containing coating can be used as various solvent-based coatings and powder coatings by preparing the solvent and the like as appropriate as mentioned above. Further, the microparticle/PR-containing coating can also be used as room-temperature drying coatings, baking coatings, ultraviolet curable coatings or electron-beam curable coatings by preparing the reactive group, curing agent and the like as appropriate as mentioned above.

Next, the microparticle/PR-containing coating film of the present invention will be described below in detail.

The microparticle/PR-containing coating film of the present invention is in the form of a layer of the above-mentioned microparticle/PR-containing coating of the present invention on an article to be coated. This microparticle/PR-containing coating film can suitably be applied to surfaces of articles where high abrasion resistance and chemical resistance are required.

Figure 1A:
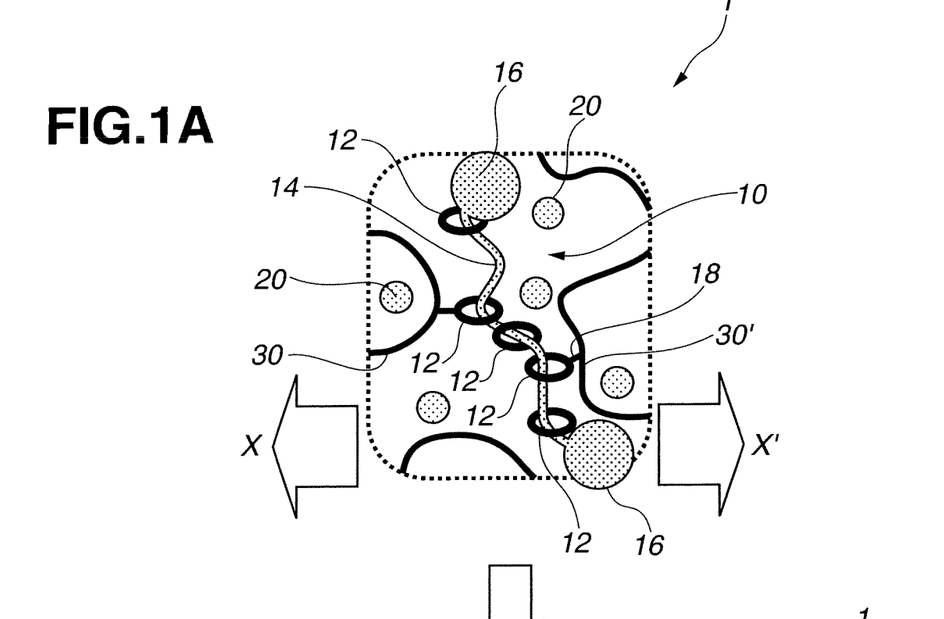
FIGS. 1A and 1B are schematic views showing one example of microparticle/PR-containing coating film according to the present invention.
Figure 1B:
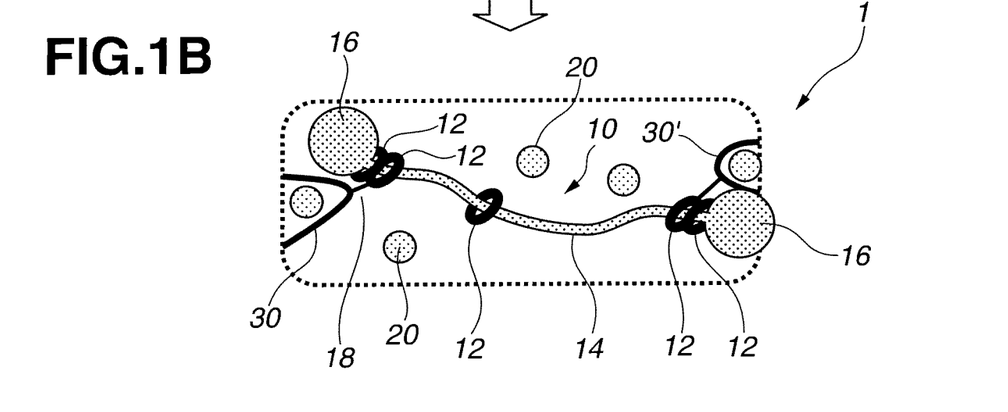

FIGS. 1A and 1B are schematic views showing one example of microparticle/PR-containing coating film of the present invention. In this drawing, the microparticle/PR-containing coating film 1 contains a modified polyrotaxane 10, microparticles 20 and resins 30 and 31 other than the polyrotaxane 10. Further, the modified polyrotaxane 10 has a cyclic molecule 12, a linear molecule 14 passing through and included in an opening of the cyclic molecule 12 and blocking groups 16 arranged on opposite ends of the linear molecule 14 to keep the cyclic molecule 12 skewered with the linear molecule 14. This modified polyrotaxane 10 forms cross-links 18 to the other resins 30 and 31 through the cyclic molecule 12.

When a deformation stress is applied to the microparticle/PR-containing coating film 1 in the direction of an arrow X-X' in FIG. 1A, the microparticle/PR-containing coating film 1 gets deformed as shown in FIG. 1B and thereby absorbs the stress. Namely, the cyclic molecule 12 moves along the linear molecule 14 under the pulley effect so that the stress can be internally absorbed by the polyrotaxane 1.

In this way, the microparticle/PR-containing coating film of the present invention benefits from the pulley effect of the polyrotaxane as shown in the drawing and thus shows high elasticity, viscoelasticity, mechanical strength and abrasion resistance as compared to conventional hard clear coats. Further, the microparticles of given average particle size are dispersed in the microparticle/PR-containing coating film as shown in the drawing without interfering with the pulley effect of the polyrotaxane. It is thus possible for the microparticle/PR-containing coating film to achieve high abrasion resistance and chemical resistance and to maintain good strain resistance and smoothness.

Figure 2:
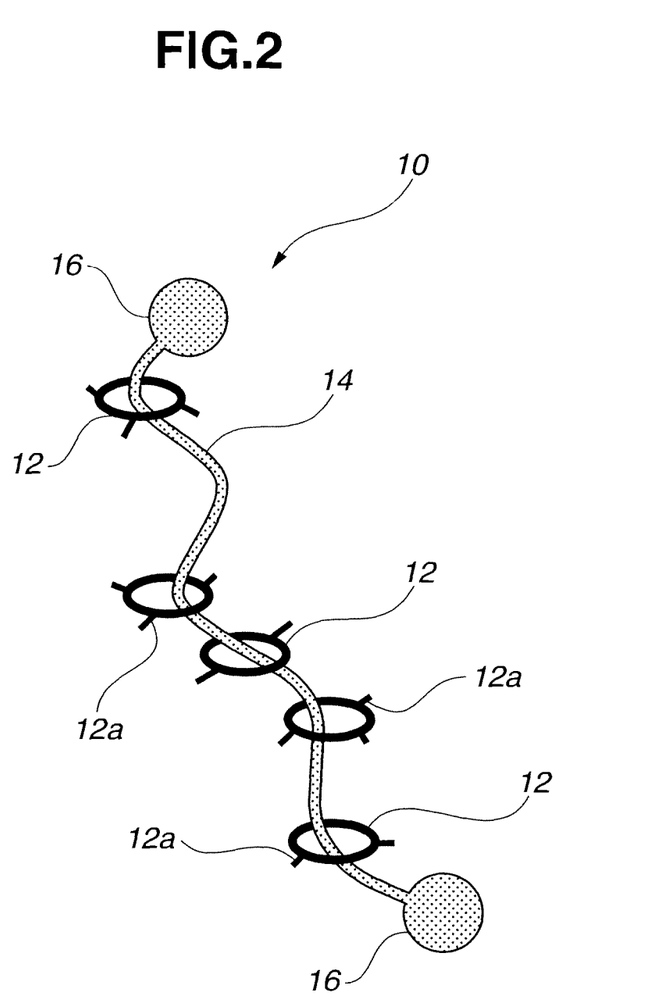
FIG. 2 is a schematic view showing one example of polyrotaxane used in the present invention.

FIG. 2 is a schematic view showing one example of the polyrotaxane used in the present invention. In this drawing, the modified polyrotaxane 10 has a cyclic molecule 12, a linear molecule 14 passing through and included in an opening of the cyclic molecule 12 and blocking groups 16 arranged on opposite ends of the linear molecule 14 to keep the cyclic molecule 12 skewered with the linear molecule 14. The linear molecule 12 has a caprolactone modification group ($-CO(CH_2)_5OH$) 12a.

The microparticle/PR-containing coating film can be applied as either a transparent clear coat, an opaque clear coat, an enamel coat, a base coat or a primer coat.

There is no particular restriction on the thickness of the coating film. Preferably, the thickness of the coating film is preferably 20 to 40 μm in the case of the transparent clear coat or opaque clear coat, 20 to 40 μm in the case of the enamel coat, 10 to 20 μm in the case of the base coat and 20 to 40 μm in the case of the primer coat. When the thickness of the coating film is in the above range, it is possible to maintain the effect and quality of the coating film, such as contamination resistance, chemical resistance, abrasion resistance and impact resistance, over a long time.

The transparent clear coat contains an additive other than the above-mentioned components, such as a dispersant, an ultraviolet absorber, a light stabilizer, a surface conditioner and an anti-popping agent.

In general, a pigment is contained in the opaque clear coat, enamel coat, base coat and primer coat. The content amount of the pigment in the opaque clear coat is generally 5% or less. Further, a delustering agent such as resin beads is added to the opaque clear coat. As the pigment in the enamel coat, base coat and primer coat, there can be used any of organic coloring pigments such as azo pigments, phthalocyane pigments and perilene pigments and inorganic coloring pigments such as carbon black, titanium dioxide and iron red.

A laminated coat using the coating of the present invention will be described below.

The laminated coat has one or more layers of the coating film of the present invention and can suitably be applied to surfaces of articles where high abrasion resistance and chemical resistance are required. It is preferable that the coating film of the present invention is an outermost layer of the laminated coat in terms of abrasion resistance.

The laminated coat will be described in detail below with reference to the drawings.

Figure 3:
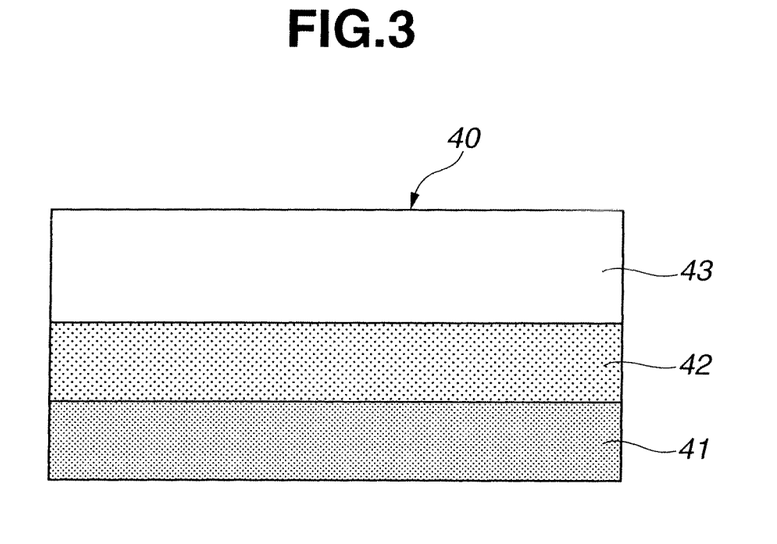
FIG. 3 is a schematic section view showing the application of the microparticle/PR-containing coating film as a clear coat layer according one embodiment of to the present invention.

FIG. 3 is a schematic section view showing one embodiment of the present invention where the microparticle/PR-containing coating film is applied as a clear coat layer. In this drawing, the laminated coat 40 has a primer coating layer 41, a color base coat layer 42 and a clear coat layer 43 to which the microparticle/PR-containing coating film is applied. Although not shown in the drawing, an article to be coated is located on a side of the primer coat layer opposite from the color base coat layer.

Figure 4:
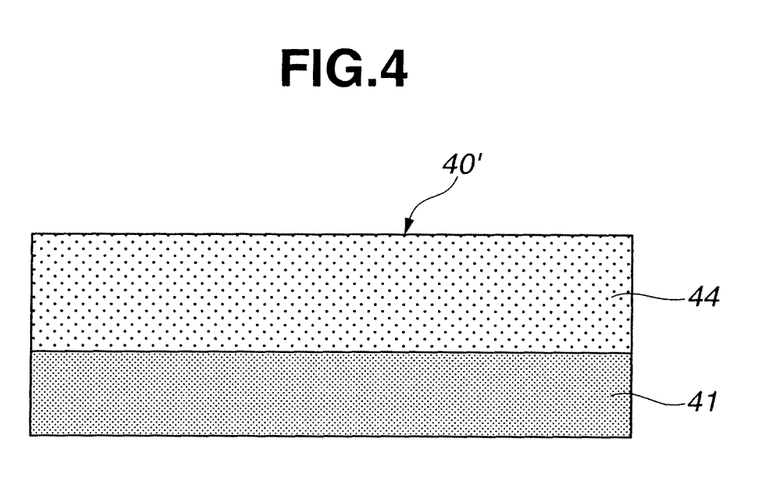
FIG. 4 is a schematic section view showing the application of the microparticle/PR-containing coating film as an enamel coat layer according to another embodiment the present invention.

FIG. 4 is a schematic section view showing another embodiment of the present invention where the microparticle/PR-containing coating film is applied as an enamel coat layer. In this drawing, the laminated coat 40' has a primer coat layer 41 and an enamel coat layer 44 to which the microparticle/PR-containing coating film is applied. Although not shown in the drawing, an article to be coated is located on a side of the primer coat layer opposite from the enamel coat layer.

It is possible to impart high abrasion resistance and chemical resistance effectively by the application of the microparticle/PR-containing coating film as the outermost layer of the laminated coat as mentioned above.

The microparticle/PR-containing coating film may also be applied to the primer coat layer 41 and/or the color base coat layer 42. In this case, it is possible that, even in the event of a breakage in the clear coat layer 43 or enamel coat layer 44 when the laminated coat 40 or 40' is subjected to e.g. flying stones (chipping input) during vehicle driving, the primer coat layer 41 or color base coat layer 42 can prevent such a breakage from extending throughout the coat.

The coated article of the present invention will be next described below.

The coated article of the present invention includes the microparticle/PR-containing coating film of the present invention and an article to be coated. It is possible to achieve high abrasion resistance and chemical resistance by the formation of the microparticle/PR-containing coating film on the article. Needless to say, the coated article having the above laminated coat also falls within the scope of the present invention.

As the material of the article to be coated, there can be used: various metal materials such as iron, aluminum and copper; various organic materials such as polypropylene and polycarbonate; and various inorganic materials such as quartz and ceramic (calcium carbonate etc.). Specific examples of the article to be coated are vehicle body parts where abrasion resistance is required, aluminum wheels treated by plating, vapor deposition, sputtering etc., door mirrors, resin products for interior and exterior uses, and wooden products such as stair, floor and furniture.

This coated article can be used for automotive vehicles, motorcycles, bicycles, railcars, other transportation equipment, construction equipment, mobile phones, electrical appliances, optical instruments, furniture, construction materials, musical instruments, bags, sporting goods, leisure goods, kitchen goods, pet goods and stationeries.

EXAMPLES

The present invention will be described in more detail by reference to the following examples and comparative examples. It is herein noted that the following examples are only illustrative and not intended to limit the present invention thereto.

Example 1

1. Preparation of Polyrotaxane

A polyrotaxane was prepared in the same manner as described in International Publication No. 2005/052026 and No. 2005/080469. One preparation example is indicated below.

(1) Preparation of PEG-carboxylic acid by TEMPO oxidation of PEG

Into 100 mL of water, 10 g of polyethylene glycol (PEG) (weight-average molecular weight: 35000), 100 mg of TEMPO (2,2,6,6-tetramethyl-1-piperidinyl oxy radical) and 1 g of sodium bromide were dissolved. The resulting solution was admixed with 5 mL of a commercially-available aqueous sodium hypochlorite solution (effective chlorine concentration: 5%), and then, stirred for 10 minutes at room temperature. Up to 5 ml of ethanol was added to the solution to decompose the remaining sodium hypochlorite. With this, the reaction was completed. A component other than inorganic salts was recovered from the solution by extraction three times with 50 ml of methylene chloride. The methylene chloride was removed from the extract by distillation with an evaporator. The distillation residue was then dissolved in 250 ml of hot ethanol and placed in a refrigerator (−4° C.) for one night, thereby extracting a PEG-carboxylic acid only. The extracted PEG-carboxylic acid was recovered and dried.

(2) Preparation of inclusion complex of PEG-carboxylic acid and α-CD

Next, 3 g of the above-prepared PEG-carboxylic acid and 12 g of α-cyclodextrin (α-CD) were each separately dissolved in 50 ml of 70° C. hot water and mixed well together by shaking. The mixed solution was placed in a refrigerator (−4° C.) for one night, thereby precipitating an inclusion complex in cream form out of the solution. The inclusion complex was recovered by freeze drying.

Into 50 ml of dimethylformamide, 0.13 g of adamantaneamine was dissolved at room temperature. The resulting solution was added to the above-obtained inclusion complex and quickly mixed well together by shaking. Subsequently, a solution of 0.38 g of a BOP reagent (benzotriazole-1-yl-oxytris(dimethylamino) phosphonium hexafluorophosphate) in DMF was added to the solution and quickly mixed well together by shaking. A solution of 0.14 ml of isopropylethylamine in DMF was further added to the solution and quickly mixed well together by shaking. With this, there was obtained a sample in slurry form. The sample was placed in a refrigerator (−4° C.) for one night. After that, the sample was washed twice by adding 50 ml of a mixed solvent of DMF/methanol (volume ratio: 1/1) to the sample, blending the sample with the solvent, subjecting the sample solution to centrifugal separation and throwing away the supernatant liquor. The sample was further washed twice with 100 ml of methanol by the same centrifugation operation as above. The thus-obtained precipitate was vacuum-dried and dissolved in 50 ml of DMSO. The resulting clear solution was added to 700 ml of water to precipitate a polyrotaxane. The precipitated polyrotaxane was recovered by centrifugal separation and vacuum- or freeze-dried. The above cycle of dissolution in DMSO, precipitation by water, recovery and drying was repeated twice. The polyrotaxane was eventually obtained as a purified reaction product. The α-CD inclusion amount of the polyrotaxane was 0.25.

(3) Preparation of hydroxylpropylated polyrotaxane

Subsequently, 500 mg of the above-prepared polyrotaxane was dissolved in 50 mL of a 1-mol/L aqueous NaOH solution followed by adding thereto 3.83 g (66 mmol) of propylene oxide. The resulting solution was stirred for one night at room temperature in an argon atmosphere, neutralized with an 1-mol/L aqueous HCL solution, dialyzed with a dialysis tube and freeze-dried, thereby recovering a hydroxylpropylated polyrotaxane. The thus-obtained hydroxylpropylated polyrotaxane was identified by $^1$H-NMR and GPC to be of the desired polyrotaxane form. The degree of modification of the polyrotaxane with the hydroxylpropyl group was 0.5.

(4) Preparation of Modified Polyrotaxane

To 500 mg of the above hydroxypropylated polyrotaxane was added 2.3 g of ε-caprolactone dried with a molecular sieve. The resulting sample was stirred for 30 minutes at 80° C., subjected to permeation and then reacted for 1 to 8 hours at 100° C. with the addition of 0.2 ml of tin 2-ethylhexanoate. The reaction was completed by visually checking the sample. After the completion of the reaction, the sample was dissolved in 50 ml of toluene. The sample solution was added to 450 ml of hexane while stirring, thereby precipitating a modified polyrotaxane. The precipitated modified polyrotaxane was recovered by centrifugal separation, vacuum- or freeze-dried and used in the present example.

2. Preparation of Microparticle/Polyrotaxane-Containing Coating

The above-obtained modified polyrotaxane was dissolved to a concentration of 10% in toluene. This modified polyrotaxane solution was added, while stirring, to an acrylic-melamine curable clear coating material (manufactured by NOF Corporation, product name: BELCOAT No. 6200GN1). Fine particles of silica (manufactured by Nissan Chemical Industries Ltd., product name: SNOWTEX XS, average particle size: 5 nm) were further added, while stirring, to the coating material. With this, a microparticle/PR-containing coating was completed. The microparticle/PR-containing coating was herein prepared in such a manner as to form a microparticle/PR-containing coating film with a microparticle content amount of 15% and a modified polyrotaxane content amount of 1%.

3. Formation of Laminated Coat

Onto a zinc-phosphated dull steel plate of 0.8 mm in thickness and 70 mm×150 mm in size, a cationic electrodeposition coating material (manufactured by Nippon Paint Co., Ltd., product name: POWERTOP U600M) was applied to a dry thickness of 20 μm. The coating material was then subjected to baking for 30 minutes at 160° C. Subsequently, an undercoating material (manufactured by BASF Coatings Japan Ltd., product name: HYEPICO No. 500, color: gray) was applied to a dry thickness of 30 μm onto the electrodeposition coat layer and baked for 30 minutes at 140° C. Further, a metallic coating material (manufactured by BASF Coatings Japan Ltd., product name: BELCOAT 6010) was applied to a dry thickness of 10 μm onto the undercoat layer. The above-prepared microparticle/PR-containing coating was then applied to a dry thickness of 30 μm by wet-on-wet process onto the metallic coat layer and baked for 30 minutes at 140° C., thereby forming a microparticle/PR-containing coating film. With this, a laminated coat was completed. The specifications of the microparticle/polyrotaxane-containing coating film are indicated in TABLE 1.

Examples 2-8 and Comparative Examples 1-2

In each example, a laminated coat was formed in the same manner as in Example 1, except for setting the average particle size of the microparticles used in the microparticle/PR-containing coating and the content amounts of the microparticles and the modified polyrotaxane in the microparticle/PR-containing coating film as indicated in TABLE 1. As the microparticles, fine particles of silica (manufactured by BYK-Chemie Japan Ltd., product name: NANOBYK-3650, average particle size: 25 nm) were used in Examples 2 and 4 to 7; fine particles of silica (manufactured by Nissan Chemical Industries Ltd., product name: MP-2040, average particle size: 200 nm) were used in Example 3; and fine particles of silica (manufactured by Nissan Chemical Industries Ltd., product name: MP-4540M, average particle size: 450 nm) were used in Comparative Example 2.

Example 8

A laminated coat was formed in the same manner as in Example 1, except for using fine particles of alumina (manufactured by BYK-Chemie Japan Ltd., product name: NANO-BYK-3610, average particle size: 25 nm) as the microparticles in the microparticle/PR-containing coating and setting the content amount of the modified polyrotaxane in the microparticle/PR-containing coating film as indicated in TABLE 1.

The specifications of each of the microparticle/polyrotaxane-containing coating films of the above examples and comparative examples are also indicated in TABLE 1.

TABLE 1

|  | Example | | | | | | | | Comparative Example | |
| --- | --- | --- | --- | --- | --- | --- | --- | --- | --- | --- |
|  | 1 | 2 | 3 | 4 | 5 | 6 | 7 | 8 | 1 | 2 |
| Average particle size (nm) of microparticles in coating film | 5 | 25 | 200 | 25 | 25 | 25 | 25 | 25 | — | 450 |
| Content amount (mass %) of microparticles in coating film | 15 | 15 | 15 | 15 | 15 | 1 | 30 | 15 | 0 | 15 |
| Kind of microparticles | silica | silica | silica | silica | silica | silica | silica | alumina | — | silica |
| Content amount (mass %) of polyrotaxane in coating film | 1 | 1 | 1 | 76.5 | 42.5 | 49.5 | 35 | 42.5 | 50 | 1 |
| Content amount (mass %) of clear coating material in coating film | 84 | 84 | 84 | 8.5 | 42.5 | 49.5 | 35 | 42.5 | 50 | 84 |
| Turbidity degree | ○ | ○ | Δ | ○ | ○ | ○ | ○ | ○ | ○ | X |
| Abrasion resistance | Δ | Δ | Δ | ⊚ | ○ | ○ | ○ | ○ | ○ | X |
| Chemical resistance | Δ | ○ | ○ | ⊚ | ⊚ | ○ | ⊚ | ⊚ | X | ○ |

[Performance Evaluation]

Each of the laminated coats of the above examples and comparative examples were evaluated for the following performance features (1), (2) and (3).

(1) Evaluation of Turbidity Degree

The turbidity degree of the microparticle/polyrotaxane-containing coating film after the baking was visually checked. In TABLE 1, the turbidity degree evaluation results are indicated as follows: "○" when there was no turbidity in the coating film; "Δ" when there was almost no, unobtrusive turbidity in the coating film; and "X" when the coating film had white turbidity and showed change in color.

(2) Evaluation of Abrasion Resistance

The abrasion resistance of the coating film was tested by placing the coating film in an abrasion tester with a dust flannel (friction cloth) adhered to a sliding unit of the abrasion tester by a double-faced tape, causing 50 reciprocating movements of the friction cloth over the coating film under a load of 0.22 g/cm$^2$, and then, visually checking the occurrence or non-occurrence of abrasive damage in the coating film. The results are also indicated in TABLE 1. In the TABLE 1, the abrasion resistance evaluation results are indicated as follows: "⊚" when there was no damage in the coating film; "○" when there was almost no damage in the coating film; "△" when there was little damage in the coating film; and "X" when there was hard, remarkable damage in the coating film.

(3) Chemical Resistance

The chemical resistance of the coating film was examined by subjecting the coating film to gasoline test (dropping a regular unleaded gasoline onto a surface of the coating film, drying the coating film surface and wiping the coating film surface with a cloth) and then checking the occurrence or non-occurrence of softening or swelling of the coating film. The results are also indicated in TABLE 1. In TABLE 1, the chemical resistance evaluation results are indicated as follows: "⊚" when there was no change in the coating film; "○" when the coating film was slightly softened; "△" when the coating film was softened; and "X" when the coating film was softened and swelled.

It is apparent from TABLE 1 that: the coating films of Example 1 to 8, which fall within the scope of the present invention, had high abrasion resistance and chemical resistance performance; whereas the coating films of Comparative Examples 1 and 2, which do not fall within the scope of the present invention, were inferior in at least one of abrasion resistance and chemical resistance. Although not shown in the table, it was confirmed that there were not seen large variations in cross-link density and breaking strength.

The invention claimed is:

1. A microparticle/polyrotaxane-containing coating, comprising:
   a solvent-based coating material;
   a modified polyrotaxane having a caprolactone modification group ($-CO(CH_2)_5OH$); and
   microparticles having an average particle size of smaller than 380 nm,
   wherein a content of the modified polyrotaxane in a coating film-forming component of the microparticle/polyrotaxane-containing coating is 10 to 90 mass %.

2. The microparticle/polyrotaxane-containing coating according to claim 1, wherein the microparticles are fine particles of either or both of silica and alumina.

3. The microparticle/polyrotaxane-containing coating according to claim 1, wherein the modified polyrotaxane has a cyclic molecule, a linear molecule passing through the cyclic molecule and blocking groups arranged on opposite ends of the linear molecule to keep the cyclic molecule skewered with the linear molecule; and wherein the cyclic molecule is a cyclodextrin having a part or all of hydroxyl groups modified with the caprolactone modification group ($-CO(CH_2)_5OH$).

4. The microparticle/polyrotaxane-containing coating according to claim 1, wherein the modified polyrotaxane has a cyclic molecule, a linear molecule passing through the cyclic molecule and blocking groups arranged on opposite ends of the linear molecule to keep the cyclic molecule skewered with the linear molecule; and wherein the cyclic molecule is a cyclodextrin having a part or all of hydroxyl groups modified with the caprolactone modification group ($-CO(CH_2)_5OH$) bonded to a $-O-C_3H_6-O-$ group.

5. A microparticle/polyrotaxane-containing coating film, consisting of: a layer of the microparticle/polyrotaxane-containing coating according to claim 1 formed on an article body to be coated.

6. The microparticle/polyrotaxane-containing coating film according to claim 5, wherein the coating film is in the form of either a transparent clear coat, an opaque clear coat, an enamel coat, a base coat or a primer coat.

7. A coated article, comprising:
   the microparticle/polyrotaxane-containing coating film according to claim 5; and
   an article to be coated.

8. The microparticle/polyrotaxane-containing coating according to claim 1, wherein the content of the modified polyrotaxane in the coating film-forming component of the microparticle/polyrotaxane-containing coating is 35 to 76.5 mass %.

* * * * *